(12) United States Patent
Pingelton

(10) Patent No.: US 9,333,895 B2
(45) Date of Patent: May 10, 2016

(54) CONNECTORS FOR TIE DOWN DEVICES AND METHODS OF USE

(76) Inventor: James Pingelton, Norman, OK (US)

(*) Notice: Subject to any disclaimer, the term of this patent is extended or adjusted under 35 U.S.C. 154(b) by 529 days.

(21) Appl. No.: 13/450,426

(22) Filed: Apr. 18, 2012

(65) Prior Publication Data

US 2012/0266420 A1 Oct. 25, 2012

Related U.S. Application Data

(60) Provisional application No. 61/477,232, filed on Apr. 20, 2011.

(51) Int. Cl.
*B60P 7/06* (2006.01)
*B60P 7/08* (2006.01)
*F16B 45/06* (2006.01)

(52) U.S. Cl.
CPC .............. *B60P 7/0823* (2013.01); *F16B 45/06* (2013.01); *Y10T 24/3484* (2015.01); *Y10T 24/45288* (2015.01)

(58) Field of Classification Search
CPC .......... F16B 45/06; F16B 45/00; F16B 45/02; F16B 45/025; B60C 27/08; B60R 22/30; B60R 9/048; B60R 9/10; B01D 3/163; B62K 13/00; B62K 3/04; B62K 3/06; E05B 67/383; E05B 73/0005; F16G 15/00
USPC .............. 24/369, 598.4, 588.1, 599.2, 265 H, 24/648; 294/82.18
See application file for complete search history.

(56) References Cited

U.S. PATENT DOCUMENTS

| | | | | |
|---|---|---|---|---|
| 222,324 | A * | 12/1879 | Stapleton | |
| 227,793 | A * | 5/1880 | Kingston | 24/598.5 |
| 397,136 | A * | 2/1889 | McLean | 24/598.5 |
| 1,584,307 | A * | 5/1926 | King | 24/577.1 |
| 1,595,892 | A * | 8/1926 | Teeples | 24/598.5 |
| 2,795,024 | A * | 6/1957 | Donaldson | 24/376 |
| 3,127,652 | A * | 4/1964 | Springer | 24/165 |
| 3,128,520 | A * | 4/1964 | Carter et al. | 24/598.5 |
| 5,956,980 | A * | 9/1999 | Jenkins, Jr. | 70/18 |
| 6,237,201 | B1 * | 5/2001 | Bonaiti | 24/598.5 |
| 6,602,015 | B1 * | 8/2003 | Evans et al. | 403/109.1 |
| 7,603,754 | B2 * | 10/2009 | Hayes et al. | 24/586.1 |
| 2002/0162201 | A1 * | 11/2002 | Liu | 24/598.5 |
| 2010/0024177 | A1 * | 2/2010 | Hayes et al. | 24/588.1 |

* cited by examiner

*Primary Examiner* — Robert J Sandy
*Assistant Examiner* — David Upchurch
(74) *Attorney, Agent, or Firm* — John M. Behles

(57) ABSTRACT

Connectors for tie down devices and methods of use are provided herein. According to some embodiments, a connector device may include two hooks that each comprise a ring section and a hooked section, the two hooks being coupled together such that when the ring sections of two hooks are aligned the hooked sections of the two hooks are moved away from one another and disposed into a locked configuration.

16 Claims, 6 Drawing Sheets

CONNECTORS FOR TIE DOWN DEVICES AND METHODS OF USE

CROSS-REFERENCE TO RELATED APPLICATIONS

This non-provisional patent application claims the benefit and priority of U.S. Provisional Patent Application Ser. No. 61/477,232, entitled "CONNECTORS FOR TIE DOWN DEVICES AND METHODS OF USE," which is hereby incorporated by reference herein in its entirety including all references cited therein.

FIELD OF THE INVENTION

The present technology relates generally to connectors for tie down devices, and more specifically, but not by way of limitation, to connectors that couple tie down devices to the rub rail of a trailer.

BACKGROUND

Commonly utilized tie down devices often include flat hooks that are joined to opposing ends of a flat strap. The flat hooks may be hooked to rub rails that extend along opposing side edges of a trailer. The flat strap is overlapped over a portion of the load that rests upon a bed of the trailer. To secure the load to the bed, the flat hooks of the tie down are engaged with the opposing rub rails of the trailer. The tie down may also include a cinching or locking device, such as a come-along, that operates to reduce the length of the strap until the load is secured to the bed.

Unfortunately, the use of flat hook connectors that directly contact the rub rail of the trailer is undesirable due to the fact that flat hooks can often damage the rub rail. Also, depending on the particular configuration of the flat hook, the flat strap may also rub against the rub rail. This may lead to failure of the flat strap as the flat strap rubs against sharp corners of the rub rail.

As such, the connectors of the present technology operate to reduce and/or eliminate these drawbacks associated with commonly utilized tie down devices.

SUMMARY OF THE INVENTION

According to some embodiments, the present technology may be directed to a connector device that comprises two hooks that each comprise a ring section and a hooked section, the two hooks being coupled together such that when the ring sections of two hooks are aligned the hooked sections of the two hooks are moved away from one another and disposed into a locked configuration.

According to additional embodiments, the present technology may be directed to a tie down strap that comprises: (a) a strap; (b) at least one flat hook associated with an end of the strap; and (c) at least one connector device that comprises two hooks that each comprise a ring section and a hooked section, the two hooks being coupled together such that when the ring sections of two hooks are aligned the hooked sections of the two hooks are moved away from one another and disposed into a locked configuration.

In some embodiments, the present technology may comprise a connector device that comprises: (a) a first hook that comprises a ring section and a hooked section, the first hook being configured to receive a flat hook of a tie down device; (b) a second hook that comprises at least a hooked section, the second hook being coupled to the first hook; and (c) wherein the hooked section of the first hook and the hooked section of the second hook are angled away from one another relative to a midline of the connector device.

BRIEF DESCRIPTION OF THE DRAWINGS

Certain embodiments of the present invention are illustrated by the accompanying figures. It will be understood that the figures are not necessarily to scale and that details (e.g., dimensions) not necessary for an understanding of the invention or that render other details difficult to perceive may be omitted. It will be understood that the invention is not necessarily limited to the particular embodiments illustrated herein.

DETAILED DESCRIPTION OF EXEMPLARY EMBODIMENTS

Figure 1:
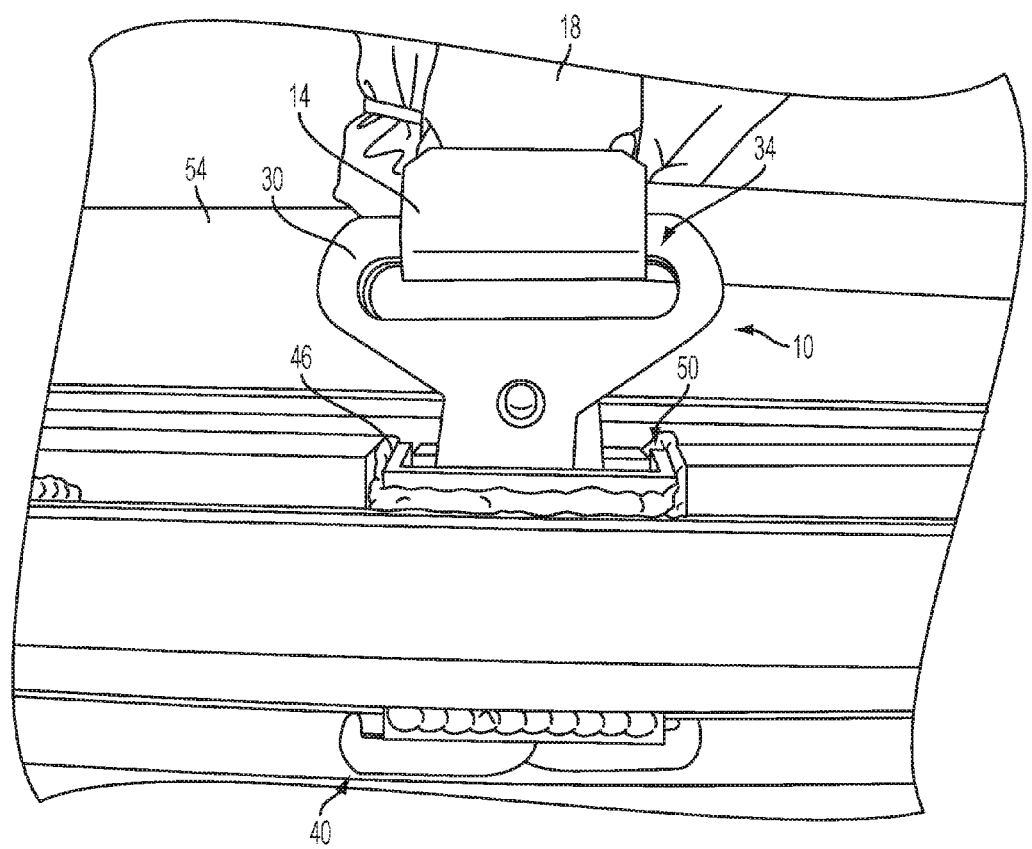
FIG. 1 is a frontal perspective view of an exemplary connector device associated with a tie down device and connected to a trailer.
Figure 2:
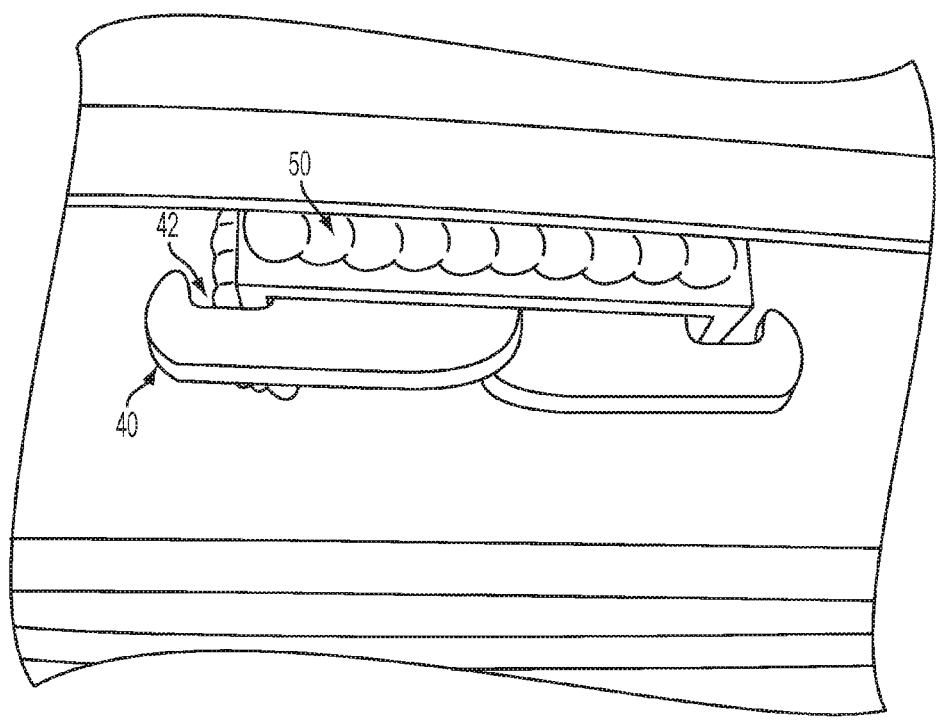
FIG. 2 is a bottom-up perspective view of an exemplary connector device associated with a tie down device, the connector device being shown in a locked configuration.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Connectors for use with tie down devices are provided herein. Additionally, tie down devices that incorporate connectors of the present technology are also provided herein. Generally speaking, the connectors of the present technology are configured to operatively connect to anchor points of trailers, such as a rub rail of a semi trailer. Rather than the tie down devices directly connecting to the anchor points of a trailer, potentially leading to damage to either the tie down device or anchor point, the connectors of the present disclosure may associate with the anchor point. The tie down may then associate with the connector, which separates the ends of tie down away from the trailer.

FIGS. 1-4 collectively illustrate an exemplary connector device 10 that associates with a tie down device 18, and in some instances a flat hook 14 of a tie down device 18. The connector device 10 is shown as including a first hook 22 which may be pivotally associated with a second hook 26. It will be understood that because the first hook 22 and the second hook 26 may be constructed identically to one another, for the purposes of brevity, only the construction of the first hook 22 will be discussed in greater detail.

The first hook 22 may be fabricated from a strong and durable material such as a metal, a metallic alloy, a composite material, or any other material that would be known to one or ordinary skill in the art with the present disclosure before them. In some embodiments, the first hook 22 may be fabricated as a monolithic unit that includes a substantially J-shaped configuration. According to some embodiments, the first hook 22 may include a ring section 30 that comprises an oblong slit 34. In some embodiments, the oblong slit 34 may be configured to receive at least a portion of the flat hook 14 of the tie down device 18 therein. In some instances, the tie down strap may be looped through the oblong slit 34 without the use of a flat hook 14.

The first hook 22 may also include a body section 38 that extends between the ring section 30 and a hooked section 40. The body section 38 may extend at an angle ø relative to a midline M of the connector device 10, see FIG. 4. It will be understood that the angle ø may vary depending upon design requirements such as the width of the anchor point (e.g., the distance between sidewalls of the anchor point) of the trailer, and the like.

The hooked section 40 may include a notch 42 that is configured to interface with a sidewall 46 (e.g., such as the lower edge) of an anchor point 50 of a trailer 54. For example, the hooked section 40 may extend below and overlap (e.g., hook around) the lower edge of the sidewall 46, as will be discussed in greater detail infra.

Figure 3:
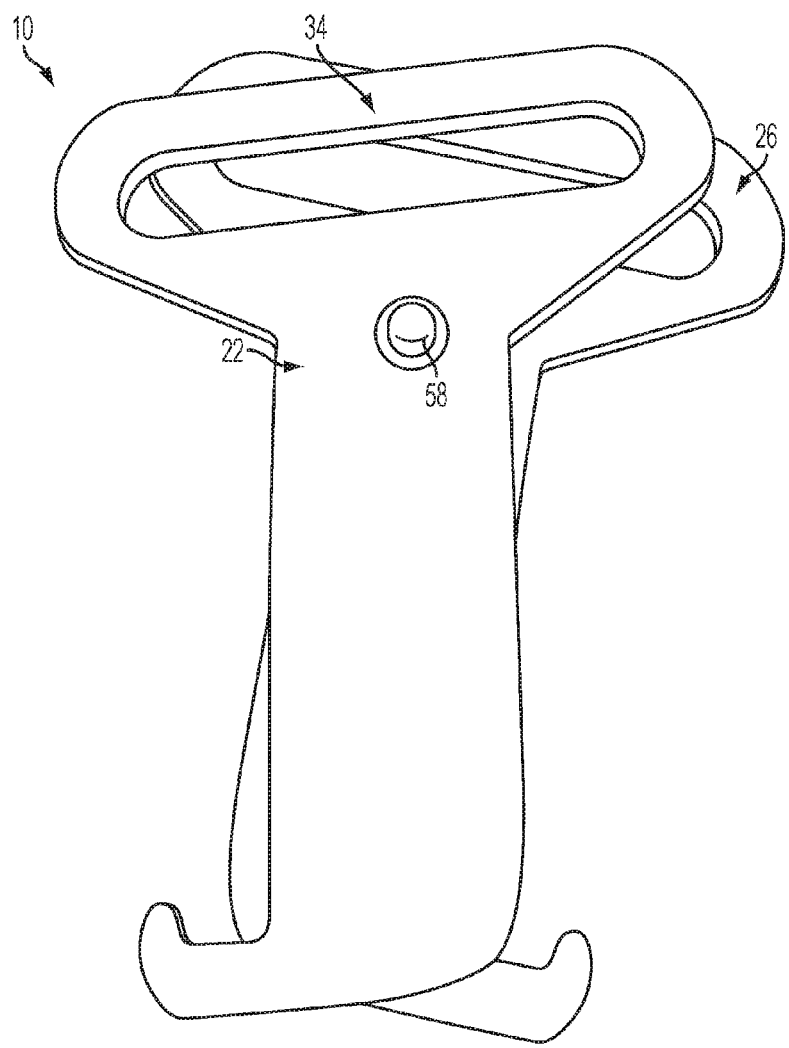
FIG. 3 is a perspective view of an exemplary connector device of FIGS. 1-2, shown in an insertable configuration.
Figure 4:
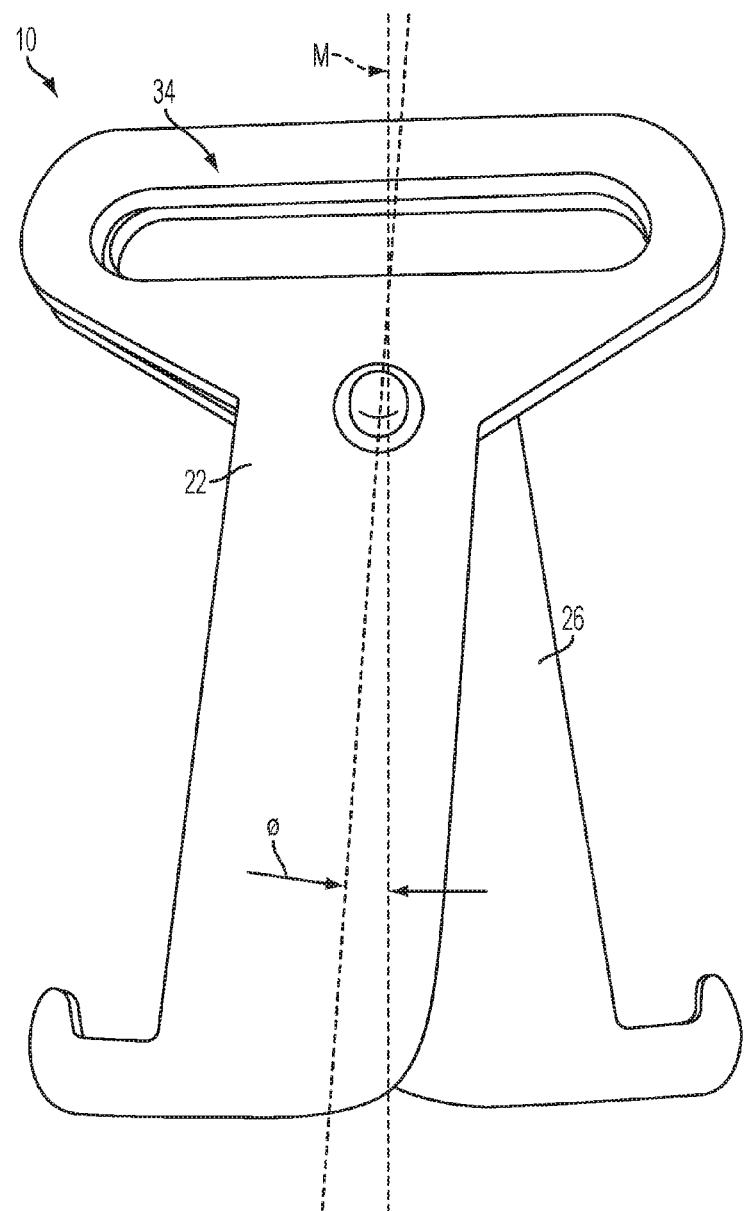
FIG. 4 is a perspective view of an exemplary connector device of FIGS. 1-2, shown in a locked configuration.

When the first hook 22 and second hook 26 are joined together, the connector device 10 may be arranged into an insertable configuration (see FIG. 3). The connector device 10 may be transitioned to the locked configuration (see FIG. 4) by substantially aligning the oblong apertures 34 of each of the first and second hooks 22 and 26.

For example, it will be understood that when the oblong slits of the first and second hooks are offset (e.g., misaligned) relative to one another, the hook sections of the first and second hooks are brought closer together and the midline M of connector device 10. This configuration may be referred to as the insertable configuration. When the oblong slits of the first and second hooks are substantially aligned with one another, the hook sections of the first and second hooks are moved further apart from one another and the midline M of connector device 10. This configuration may be referred to as the locked configuration.

Although not shown, apertures may be fabricated into each of the body sections 38 of the first and second hooks 22 and 26, respectively. When the first and second hooks are disposed into mating relationship with one another, the apertures may align with one another to form a single aperture for receiving a fastener therethrough, such as a bolt, pin, clip, stud, or the like. In some embodiments, the connector device 10 includes a rivet 58 that pivotally connects the first and second hooks 22 and 26 together. To assemble, the first and second hooks are overlapped such that the hooked sections point in opposite directions relative to one another. Next, the apertures of the first and second hooks 22 and 26 are aligned with one another and rivet 58 is inserted therethrough to secure the first and second hooks together.

In operation, the first and second hooks 22 and 26 of the connector device 10 are pivotally adjusted to place the connector device 10 into the insertable configuration. The hooked sections 40 of the connector device 10 are then inserted into an anchor point 50 of the trailer 54. When the connector has been inserted into the anchor point 50, the connector is pivotally adjusted to the locked configuration. When the connector device 10 is pivotally adjusted into the locked configuration, the hook sections 40 of the first and second hooks 22 and 26 may engage the bottom edges of the sidewalls 46 of the anchor point 50 when a vertical force (e.g., tensile/pulling force) is applied to connector device 10. For example, when a flat hook 14 of a tie down 18 is inserted into the oblong slits of the first and second hooks 22 and 26, the flat hook 14 applies tensile forces onto the connector device 10, urging the connector device 10 upwardly such that the hooked sections 40 of the first and second hooks 22 and 26 engage the lower edge of the sidewalls of the anchor point 50.

Although not shown, a second connector device that is substantially similarly constructed to the connector device 10 may be disposed on an anchor point that is located on the opposite side of the trailer 54. As second flat hook disposed on the opposing end of the tie down 18 may be inserted into the oblong slits of the first and second hooks of the second connector. The tie down 18 may be cinched utilizing a comealong or other similar device. As the tension on the tie down 18 increases (e.g., specifically the strap of the tie down), the connector devices 10 are urged upwardly into secure engagement with the sidewalls of the anchor point 50.

According to other embodiments, rather than utilizing a flat hook, the strap may directly engage (e.g., overlap, enwrap, loop, and so forth) the oblong slits of the first and second hooks. As such, the oblong slits of the first and second hooks may include a protective coating that prevents the strap from rubbing against the edges of the oblong slits of the first and second hooks.

Figure 5:
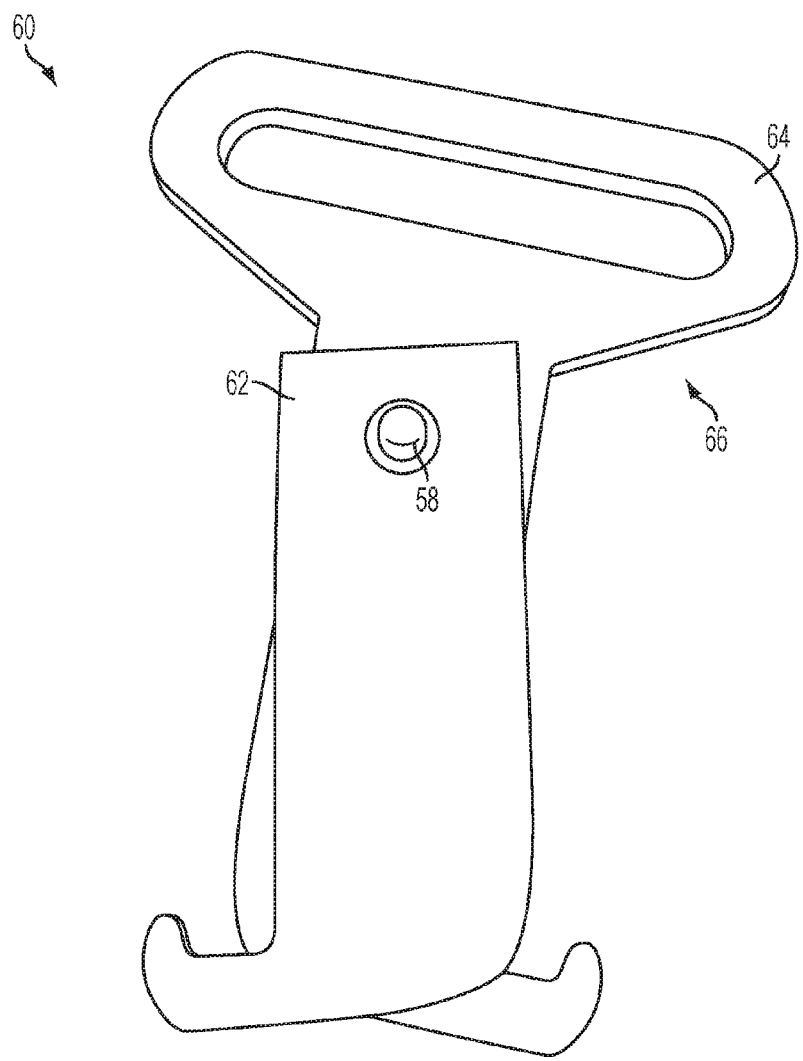
FIG. 5 is a perspective view of an alternative embodiment if a connector device, constructed in accordance with the present technology.
Figure 6:
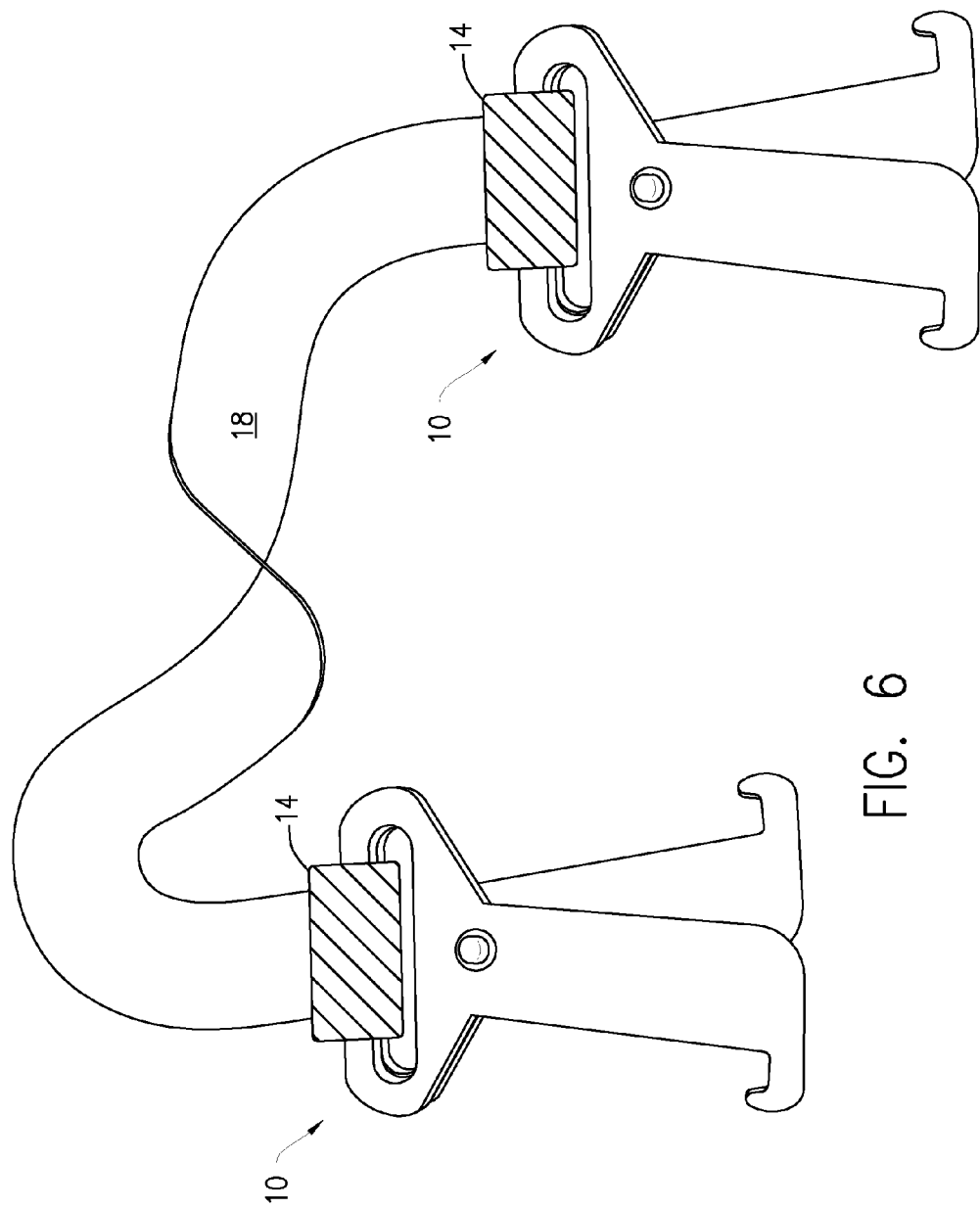
FIG. 6 illustrates two connector devices of the present technology in association with a tie down strap.

FIG. 5 illustrates an alternative embodiment of an exemplary connector device 60. The connector device 60 is similar to the connector device 10 of FIG. 1 with the exception that the second hook 62 of the connector device 60 does not have a ring section. That is, only the first hook 64 comprises a ring section 66. Therefore, a flat hook of a tie down device may engage with the ring section of the first hook 64.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A connector device, comprising two hooks that each comprise a ring section and a hooked section, the ring section comprising an aperture defined by a continuous sidewall, the two hooks being coupled together such that when the ring sections of two hooks are aligned the hooked sections of the two hooks are moved away from one another and disposed into a locked configuration, the apertures of the ring sections are aligned with one another to form a single aperture when the two hooks are moved away from one another and disposed into a locked configuration, and the ring sections are not aligned to form the single aperture when the two hooks are moved towards one another.

2. The connector device according to claim 1, wherein at least one of the two ring sections of the two hooks comprises an oblong slit that receives a flat hook of a tie down strap.

3. The connector device according to claim 2, wherein when the oblong slits of the two hooks are aligned, the flat hook may be engaged with the ringed sections of the two hooks.

4. The connector device according to claim 1, wherein the ring section is separated from the hooked section by a body section.

5. The connector device according to claim 1, wherein when the ringed sections of the two hooks are misaligned the hooked sections of the two hooks are moved closer to one another and disposed in an insertable configuration.

6. The connector device according to claim 1, wherein the hooked section comprises a notch.

7. The connector device according to claim 1, wherein the two hooks are pivotally coupled to one another via a rivet.

8. A tie down strap, comprising:
   a strap;
   at least one flat hook associated with an end of the strap; and
   at least one connector device that comprises two hooks that each comprise a ring section and a hooked section, the two hooks being coupled together such that when the ring sections of two hooks are aligned the hooked sections of the two hooks are moved away from one another and disposed into a locked configuration, and the ring sections are not aligned when the two hooks are moved towards one another.

9. The tie down device according to claim 8, further comprising:
   a second flat hook disposed on an opposing end of the strap; and
   a second connector device disposed on an opposing end of the strap from the at least one connector device.

10. The tie down device according to claim 8, wherein the ring section comprises an oblong slit that receives a flat hook of a tie down strap.

11. The tie down device according to claim 10, wherein when the oblong slits of the two hooks are aligned, the flat hook may be engaged with the ringed sections of the two hooks.

12. The tie down device according to claim 8, wherein the ring section is separated from the hooked section by a body section.

13. The tie down device according to claim 8, wherein when the ringed sections of the two hooks are misaligned the hooked sections of the two hooks are moved closer to one another and disposed in an insertable configuration.

14. The tie down device according to claim 8, wherein the hooked section comprises a notch.

15. The tie down device according to claim 8, wherein the two hooks are pivotally coupled to one another via a rivet.

16. A connector device, comprising:
   a first hook that comprises a ring section and a hooked section, the first hook being configured to receive a flat hook of a tie down device, wherein the ring section comprises an aperture defined by a sidewall that comprises flat upper and lower sections and rounded opposing sides;
   a second hook that comprises at least a hooked section, the second hook being coupled to the first hook; and
   wherein the hooked section of the first hook and the hooked section of the second hook are angled away from one another relative to a midline of the connector device and the hooked sections are pivotally connected to one another by a fastener that extends between apertures in the hooked sections.

\* \* \* \* \*